United States Patent [19]

Jarre et al.

[11] 4,237,237

[45] Dec. 2, 1980

[54] HYDROPHOBIC POLYURETHANE FOAMS, THEIR MANUFACTURE AND USE

[75] Inventors: Wolfgang Jarre, Ludwigshafen; Rolf Wurmb, Heidelberg, both of Fed. Rep. of Germany

[73] Assignee: BASF Aktiengesellschaft, Fed. Rep. of Germany

[21] Appl. No.: 34,541

[22] Filed: Apr. 30, 1979

Related U.S. Application Data

[63] Continuation-in-part of Ser. No. 932,355, Aug. 9, 1978, abandoned.

[30] Foreign Application Priority Data

Aug. 25, 1977 [DE] Fed. Rep. of Germany ....... 2738268

[51] Int. Cl.$^3$ ............................................. C08G 18/14
[52] U.S. Cl. .................................... 521/128; 210/692; 210/693; 405/60; 521/157; 521/905
[58] Field of Search ..................... 521/128, 157, 905; 405/60; 210/36, 39, 40

[56] References Cited

U.S. PATENT DOCUMENTS

| 3,476,933 | 11/1969 | Mendelsohn | 521/157 |
|---|---|---|---|
| 3,505,250 | 4/1970 | Saunders | 521/157 |
| 3,567,663 | 3/1971 | Triolo et al. | 521/157 |
| 3,617,551 | 11/1971 | Johnston et al. | 210/23 R |
| 3,681,237 | 8/1972 | Orban et al. | 210/40 |
| 3,779,908 | 12/1973 | Gregory | 210/23 R |
| 3,852,193 | 12/1974 | Jakubek et al. | 210/73 OW |
| 3,886,067 | 5/1975 | Miranda | 210/40 |
| 3,888,766 | 6/1975 | DeYoung | 210/36 |
| 3,917,528 | 11/1975 | Orban et al. | 210/36 |
| 3,953,406 | 4/1976 | Marsh | 521/905 |
| 3,959,191 | 5/1976 | Kehr et al. | 521/905 |

FOREIGN PATENT DOCUMENTS 1210967 11/1970 United Kingdom .
1319747 6/1973 United Kingdom .

Primary Examiner—Maurice J. Welsh
Attorney, Agent, or Firm—Keil & Witherspoon

[57] ABSTRACT

Hydrophobic polyurethane foams which have densities of from 4 to 15 g/liter and in which the number of closed cells is from 2 to 30%, and the number of open cells from 98 to 70%, based on the total number of cells, are obtained from polyisocyanates, polyhydroxy compounds, catalysts and water, with or without lipophilic compounds, the components being reacted in such amounts that the ratio of hydrogen atoms capable of undergoing a Zerewitinoff reaction to NCO groups is from 1.3 to 10:1. The foams are suitable for the absorption of oil and/or by hydrophobic solvents, which may or may not contain halogen, from water.

4 Claims, No Drawings

HYDROPHOBIC POLYURETHANE FOAMS, THEIR MANUFACTURE AND USE

This application is a continuation-in-part application of our application Ser. No. 932,355, filed Aug. 9, 1978 which application is now abandoned.

The present invention relates to polyurethane foams which have densities of from 4 to 15 g/liter and which, because they are hydrophobic and contain closed and open cells, are particularly suitable for the absorption of oil and hydrophobic compounds which may or may not contain halogen, from water.

The manufacture of polyurethane foams from polyisocyanates and polyhydroxy compounds, with or without chain extenders, assistants and additives, is known from numerous patents and publications in the literature. By way of example, reference may be made to the monographs by J. H. Saunders and K. C. Frisch, High Polymers, Volume XVI "Polyurethanes" Parts I and II (published by Interscience Publishers, New York) and R. Vieweg and A. Höchtlen, Kunststoff-Handbuch, Volume VII, Polyurethane, Carl Hanser Verlag, Munich.

According to another proposal, open-cell foams of polyurethanes, urea-formaldehyde condensates, polystyrene, cellulose acetate and the like are used for the absorption of oil present on water surfaces. According to U.S. Pat. No. 3,779,908, the absorption of oil is brought about by allowing a dispersion of crude oil in water to flow through a flexible, open-cell foam. According to U.S. Pat. No. 3,886,067, oleophilic semi-rigid or rigid foams are spread on water surfaces on which oil is present, and after the oil has been absorbed on the foam, the latter is collected and removed.

It is a disadvantage of the above processes that they cannot be used on the open sea, especially if the sea is rough, that transporting the bulky foam particles to their place of use is expensive and that the oil absorption is low, since the open-cell foam particles allow the absorbed oil to rapidly flow out again, and sink in water, whilst the closed-cell foams have too small a surface area.

It is an object of the present invention to provide polyurethane foams which do not suffer from these disadvantages. It is a further object to make it possible to manufacture the polyurethane foams rapidly, in situ, from polyurethane systems which, being liquid, can be transported in a space-saving and therefore inexpensive manner.

We have found, surprisingly, that these objects are achieved by providing polyurethane foams which are hydrophobic and simultaneously possess closed and open cells in certain ratios, since such foams are particularly suitable for absorbing oil and halogen-containing hydrophobic solvents from water.

Accordingly, the present invention relates to hydrophobic polyurethane foams which are characterized in that they have a density of from 4 to 15 g/liter, preferably from 5 to 12 g/liter, and that the number of closed cells is from 2 to 30%, preferably from 5 to 15%, and the number of open cells is from 98 to 70%, preferably from 95 to 85%, based on the total number of cells.

The hydrophobic polyurethane foams according to the invention are manufactured either by the prepolymer process or, preferably, by the one-shot process, from organic polyisocyanates, polyhydroxy compounds, water and catalysts, with or without blowing agents, lipophilic compounds, chain extenders, assistants and additives, the ratio of all hydrogen atoms capable of undergoing a Zerewitinoff reaction—these hydrogen atoms being bonded to the polyhydroxy compound and water and to the lipophilic compound and chain extender if used—to the NCO groups of the polyisocyanate being from 1.3 to 10:1, and the ratio of hydrogen atoms capable of undergoing a Zerewitinoff reaction—these hydrogen atoms being bonded to the polyhydroxy compound and to the lipophilic compound and chain extender if used—to the NCO groups of the polyisocyanate being from 0.7 to 1.3:1. The foams are advantageously manufactured on site using the two-component one-shot process.

The following may be noted with regard to the starting components which can be used to manufacture the hydrophobic polyurethane foams:

Preferred organic polyisocyanates are aromatic diisocyanates and polyisocyanates. Specific examples are 2,4- and 2,6-toluylene diisocyanate, 2,4'-, 4,4'- and 2,2'-diphenylmethane diisocyanate and their isomer mixtures, and mixtures of toluylene diisocyanates and diphenylmethane diisocyanates. However, the use of technical-grade mixtures of diphenylmethane diisocyanates and polyphenylmethylene polyisocyanates (crude MDI) and mixtures of toluylene diisocyanates and crude MDI are preferred. Modified polyfunctional isocyanates, i.e. products obtained by chemical reaction of the above diisocyanates and/or polyisocyanates, may also be employed, e.g. polyisocyanates containing urethane groups such as those described for example in Belgian Pat. No. 752,261 or U.S. Pat. No. 3,394,164.

The polyhydroxy compounds used are advantageously linear and/or branched hydroxyl-containing polyethers having molecular weights of from about 300 to about 10,000, preferably from about 1,000 to about 6,000, and having hydroxyl numbers from about 700 to about 20, preferably from 200 to 40. The hydroxyl-containing polyethers are manufactured by reacting one or more substituted or unsubstituted alkylene oxides of 2 to 4 carbon atoms in the alkylene radical with a starter molecule which contains at least two active hydrogen atoms. Examples of alkylene oxides are tetrahydrofuran, 1,2- and 2,3-butylene oxide and, preferably, propylene oxide. It is also possible to use mixtures of propylene oxide and ethylene oxide in which the ethylene oxide content is preferably less than 20% by weight, based on the total weight of the mixture. The alkylene oxides may be used individually, in alternation or as mixtures.

Examples of suitable starter molecules are water, aliphatic and aromatic dicarboxylic acids, e.g. adipic acid and terephthalic acid, and, preferably, dihydric and polyhydric alcohols, e.g. ethylene glycol, propane-1,2-diol, propane-1,3-diol, butane-1,4diol, hexane-1,6-diol, glycerol, trimethylolpropane, hexane-2,4,6-triol, pentaerythritol, sorbitol and sucrose.

The polyhydroxy compounds used are preferably difunctional and trifunctional hydroxyl-containing poly-(propylene oxides) having molecular weights of from 2,000 to 6,000.

Examples of suitable lipophilic compounds are substituted or unsubstituted, saturated and/or unsaturated aliphatic fatty acids of 10 to 25, preferably of 12 to 20, carbon atoms in the molecule, and their derivatives, preferably their esters with alcohols of 2 to 20 carbon atoms, and their amides. Lipophilic fatty acid esters and fatty acid amides which contain groups which react with an isocyanate and which therefore become built into the polyurethane foam structure are particularly preferred. Specific examples are fatty acids, e.g. capric acid, lauric acid, myristic acid, palmitic acid, stearic acid, arachidic acid, lignoceric acid, oleic acid, ricinoleic acid, linoleic acid and linolenic acid, fatty acid esters, e.g. castor oil and tall oil, adducts of the above fatty acids and propylene oxide and/or ethylene oxide, and fatty acid amides, e.g. oleic acid monoethanolamide and diethanolamide, ricinoleic acid monoethanolamide and diethanolamide, and their N,N-dialkylamides, e.g. ricinoleic acid dimethylaminopropylamide.

If lipophilic compounds are co-used in the manufacture of the hydrophobic polyurethane foams of the invention, the above polyhydroxy compounds and lipophilic compounds are used in molar ratios of from 1:3 to 1:20, preferably from 1:6 to 1:15 and especially about 1:10.

It may at times be advantageous to use chain extenders in addition to the polyhydroxy compounds of relatively high molecular weight. The chain extenders have molecular weights of less than 300, preferably of from 80 to 200, and preferably contain two active hydrogen atoms. Examples of suitable chain extenders are aliphatic and/or aromatic diols of 2 to 14, preferably of 4 to 10, carbon atoms. e.g. ethylene glycol, propanediol, decane-1,10-diol and preferably butane-1,4-diol, hexane-1,6-diol and bis-(2-hydroxyethyl)-hydroquinone. However, the polyurethane foams of the invention are preferably manufactured in the absence of chain extenders.

A blowing agent which must be used in the process of the invention is water which reacts with some of the isocyanate groups with the formation of carbon dioxide. Other blowing agents that can be additionally employed are low-boiling liquids which vaporize under the influence of the exothermic polymerization reaction. Liquids are suitable which are inert to the organic polyisocyanate and preferably have a boiling point below 50° C. Examples of such liquids which are preferably used as halohydrocarbons such as methylene chloride, trichlorofluoromethane, dichlorofluoromethane, dichloromonofluoromethane, dichlorotetrafluoroethane and 1,1,2-trichloro-1,2,2-trifluoroethane. Mixtures of these low-boiling liquids with one another and/or with other substituted or unsubstituted hydrocarbons may also be employed.

The most advantageous amount of low-boiling liquid for the production of the foams depends on the density of the foam it is desired to achieve and on the amount of water used. When additional blowing agents are used, amounts of from 5 to 40% by weight, based on 100 parts by weight of organic polyisocyanate, give satisfactory results.

To manufacture the hydrophobic polyurethane foams of the invention by the one-shot method, it may be advantageous-depending on the nature of the polyhydroxy compounds and lipophilic compounds used—to mix the water, serving as the blowing agent, with a solubilizing agent. Suitable solubilizing agents are all organic solvents with boiling points of from 20° to 110° C., preferably from 30° to 70° C., which are miscible with water in all proportions and are inert toward isocyanate groups under the reaction conditions. Examples are acetone, methyl ethyl ketone, dioxane and tetrahydrofuran, amongst which acetone is preferred. The water is mixed with the solubilizing agent in a weight ratio of water to solubilizing agent of from 1:1 to 10:1, preferably from 2:1 to 4:1.

The polyurethane foams of the invention can be manufactured in situ. In such cases it has proved advantageous to add to the reaction mixture—in order to accelerate the reaction between the polyhydroxy compounds, the water, any chain extenders, the lipophilic compounds, where these contain groups in the molecule capable of undergoing a Zerewitinoff reaction, and the organic polyisocyanates-conventional highly reactive catalysts, for example tertiary amines, e.g., dimethylbenzylamine, N-methylmorpholine, N-ethylmorpholine, dimethylpiperazine, 1,2-dimethylimidazole, 1-azabicyclo-(3,3,0)-octane and preferably triethylenediamine and metal salts, e.g. tin dioctoate, lead octoate and tin diethylhexanoate, and preferably tin-II salts and dibutyl-tin dilaurate or, preferably, mixtures of tertiary amines and organic tin salts. To achieve advantageous reaction times for the foaming reaction, the amount of catalyst to be used, which depends on the reactivity-which in turn is a function of the structure-of the chosen catalyst or catalyst mixture is determined empirically. If the polyurethane foams of the invention are manufactured in situ of the one-shot process, the catalysts, and their amounts, must be selected so that the start times at reaction temperatures of from 0° to 35° C. are from about 2 to 10 seconds, preferably from 2 to 5 seconds. The start time or cream time is the time up to which the foamable mixture can be poured without problems, i.e. the time available from mixing up to the start of a visible reaction, within which time the mixing of the starting materials, the discharge of the mixture from the mixing equipment, and the spraying of the reaction mixtures must be carried out.

According to another embodiment of the process, polyurethane block foams are produced from the above starting components, using conventional catalysts for the manufacture of block foams. These blocks foams can be chopped up in a conventional manner; advantageously, however, the block foams are cut up into boards which may if desired be crushed to increase their porosity. The foam chips or boards can be spread on the surface of the oil-containing water, collected after absorption of oil, and squeezed out. Alternatively, the foam chips can be used as a packing in absorption columns.

Assistants and additives may also be incorporated into the reaction mixture. Examples include stabilizers, hydrolysis retarders, pore regulators and surfactants.

It is possible to use, for example, surfactants which serve to assist homogenization of the starting materials and may also be capable of regulating the cell structure of the foams. Examples include siloxane-oxyalkylene copolymers and other organopolysiloxanes, oxyethylated alkylphenols, oxyethylated fatty alcohols, paraffin oils, castor oil or ricinoleic acid esters and turkey red oil, which are used in amounts of from 0.2 to 6 parts by weight per 100 parts by weight of polyisocyanate.

Further information on the above conventional additives and assistants are to be found in the specialist literature, for example in the monograph by Saunders and Frisch "High Polymers", Volume XVI, "Polyurethanes", Parts 1 and 2, 1967.

As already explained, the polyurethane foams of the invention are preferably manufactured by the one-shot process.

The usual method is to react a mixture of the polyhydroxy compound and water, with or without the lipophilic compound and a chain extender, with the organic polyisocyanate in the presence of assistants and additives at from 0° to 35° C., preferably from 15° to 25° C., in such amounts that the ratio of hydrogen atoms, capable of undergoing a Zerewitinoff reaction, in the polyhydroxy compounds, lipophilic compounds and chain extenders, if any, to NCO groups of the polyisocyanate is from 0.7 to 1.3:1, preferably about 1:1, and the ratio of all hydrogen atoms capable of undergoing a Zerewitinoff reaction-these hydrogen atoms being bonded to the polyhydroxy compound, lipophilic compound, chain extender if any, and water, to the NCO groups of the polyisoycanate is from about 1.3 to 10:1, preferably from 1.5 to 5:1. If a mixing chamber with a plurality of feed nozzles is used, the starting components can be introduced individually and be mixed thoroughly in the mixing chamber. However, it has proved particularly advantageous to use the two-component process and to use the combined mixture of polyhydroxy compound, lipophilic compound, chain extender, if any, and water, as well as catalysts, assistants and additives, as component A, whilse the organic polyisocyanates are used as components B. Using this procedure, it is not only advantageous that the components A and B can be separately stored for a limited time and be transported in a space-saving manner, but it is also particularly advantageous that the components for the manufacture of the polyurethane foams merely require thorough mixing in situ. The spreading of the hydrophobic polyurethane foams of the invention on water, and the removal of the foams, impregnated with oil and/or halogen-containing hydrophobic solvents, from the water surface is effected by means of conventional equipment which is advantageously installed on boats or in aircraft.

Because of their chemical structure, their density and the ratio of open cells to closed cells, the hydrophobic polyurethane foams of the invention possess a high absorption capacity for oil, for example crude oil, fuel oil and diesel oil, and for hydrophobic compounds which may or may not contain halogen, for example solvents, e.g. hexane, benzene, toluene, aniline, chloroform, carbon tetrachloride, dichloroethane and hexachlorocyclopentadiene.

In the Examples, parts are by weight.

EXAMPLE 1

To manufacture the polyurethane foam, a mixture of
43.3 parts of a trifunctional poly(propylene oxide) with poly(ethylene oxide) end groups, having an OH number of 35 (Lupranol 1341 from BASF AG),
43.3 parts of a reaction product of oleic acid and diethanolamine (Luprintan HDF from BASF AG),
2.6 parts of a silicone-containing stabilizer (DC 190 from Dow Corning),
2.0 parts of an amine catalyst (Niax A1 from Union Carbide),
2.0 parts of dimethylethanolamine,
0.5 part of dibutyl-tin dilaurate,
10 parts of water, and
10 parts of acetone is reacted at room temperature with
200 parts of a mixture of diphenylmethane diisocyanates and polyphenyl-polymethylene polyisocyanates (crude MDI).

COMPARATIVE EXAMPLE A

A mixture of
70 parts of N,N,N',N'-tetrakis-(2-hydroxypropyl)-ethylenediamine (Lupranol 3400 from BASF AG),
20 parts of castor oil,
4 parts of an oil-soluble non-ionic surface-active compound (Span 20 from Atlas Chemie),
4 parts of a water-soluble non-ionic surface-active compound (Tween 21 from Atlas Chemie),
5 parts of a silicone-containing foam stabilizer (DC 190 from Dow Corning), and
15 parts of trichlorofluoromethane is reacted at room temperature with
118 parts of toluylene diisocyanate.

COMPARATIVE EXAMPLE B

The procedure described in Comparative Example A is followed, but instead of castor oil 20 parts of tall oil are used.

COMPARATIVE EXAMPLE C

The procedure described in Comparative Example B is followed, but instead of toluylene diisocyanate 200 parts of crude MDI are used.

EXAMPLES 2 TO 5

To manufacture polyurethane foams, mixtures of the components listed in Table 1 are reacted, at room temperature (25° C.), with 200 parts of a mixture of diphenylmethane diisocyanates and polyphenyl-polymethylene polyisocyanates (crude MDI).

The properties obtained, and the oil absorption capacity of the foams of Examples 2 to 5 and of Comparative Examples A to C are summarized in Table 2.

TABLE 1

| Components | Example 2 | Example 3 | Example 4 | Example 5 |
|---|---|---|---|---|
| Trifunctional polypropylene/polyethylene glycol having an OH number of 35 (Lupranol 1341) | 43.3 parts | 21.75 parts | — | — |
| trifunctional polypropylene glycol having an OH number of 40 (Lupranol 1331) | — | — | 43.4 parts | — |
| trifunctional polypropylene/polyethylene glycol having an OH number of 26 (Lupranol 1371) | — | — | — | 43.3 parts |
| reaction product of oleic acid and diethanolamine (Luprintan HDF) | 43.3 parts | 62.25 parts | 43.3 parts | 43.3 parts |
| DC 190 | 2.6 parts | 2.6 parts | 2.6 parts | 2.6 parts |
| Niax A 1 | 1.5 parts | 2.0 parts | 2.0 parts | 2.0 parts |
| Dimethylethanolamine | 1.0 part | 2.0 parts | 2.0 parts | 2.0 parts |
| Water | 10 parts | 10 parts | 10 parts | 10 parts |
| Acetone | 10 parts | 10 parts | 10 parts | 10 parts |

TABLE 2

| | Measured properties, and oil absorption capacity | | | | | | | |
|---|---|---|---|---|---|---|---|---|
| Examples/Comparative Examples | 1 | 2 | 3 | 4 | 5 | A | B | C |
| Start time [sec] at 23° C. | 3 | 5 | 4 | 4 | 2 | 15 | 30 | 11 |
| Rise time [sec] at 23° C. | 10 | 20 | 12 | 18 | 10 | 60 | 50 | 45 |
| Density[1] [g/liter] | 10 | 7.0 | 18 | 12 | 16 | 40 | 27 | 105 |
| % of closed cells[2] | 10 | 3 | 5 | 8 | 10 | 35 | 35 | 99 |
| Oil absorption[3] in % by weight | | | | | | | | |
| after 24 hours | 275 | 375 | 270 | 525 | 330 | 125 | 145 | 105 |
| after 48 hours | 310 | 400 | 295 | 580 | 380 | 130 | 135 | 110 |
| after 66 hours | 580 | 600 | 500 | 640 | 495 | 135 | 205 | 110 |

[1]The densities were determined in a conical beaker (1 liter capacity).
[2]According to Iso TC 61 Wg 1
[3]The oil absorption was tested in the laboratory on 5 × 5 × 5 cm foam cubes. The cubes were allowed to float on oil for 24, 48 or 66 hours. They were then dried on filterpaper for 24 hours.

EXAMPLE 6

To manufacture the polyurethane foam, a mixture of
90 parts of a trifunctional poly(propylene oxide) with poly(ethylene oxide) end groups, having an OH number of 35 (Lupranol 1341 from BASF AG),
10 parts of a reaction product of oleic acid and diethanolamine (Luprintan HDF from BASF AG),
3 parts of a silicone-containing stabilizer (DC 190 from Dow Corning),
2.0 parts of an amine catalyst (Niax A1 from Union Carbide),
4 parts of dimethylethanolamine,
3 parts of triethylenediamine (Dabco 33 LV from Houdry Process Corp.),
50 parts of water, and
10 parts of acetone
is reacted at room temperature with
180 parts of a mixture of 90 parts of crude MDI and 90 parts of toluylene diisocyanates.

The rising mixture is poured onto a flat sheet and allowed to expand.

EXAMPLE 7

To manufacture the polyurethane foam, a mixture of
87 parts of a trifunctional poly(propylene oxide) with poly(ethylene oxide) end groups, having an OH number of 35 (Lupranol 1341 from BASF AG),
13 parts of a reaction product of oleic acid and diethanolamine (Luprintan HDF from BASF AG),
3 parts of a silicone-containing stabilizer (Tegostab B 1903 from Goldschmidt AG),
2.0 parts of an amine catalyst (Niax A1 from Union Carbide),
4 parts of dimethylethanolamine,
3 parts of triethylenediamine (Dabco 33 LV from Houdry Process Corp.),
50 parts of water, and
25 parts of acetone is reached at room temperature with
230 parts of a mixture of diphenylmethane diisocyanates and polyphenyl-polymethylene polyisocyanates (crude MDI).

The rising mixture is poured onto a flat sheet and allowed to expand.

EXAMPLE 8

The procedure of Example 7 is followed, except that 207.3 parts of a mixture of crude MDI (Lupranat M 20 from BASF AG) and toluylene diisocyanates in a weight ratio of 8:2 is used as polyisocyanate instead of crude MDI.

EXAMPLE 9

To manufacture the polyurethane foam, a mixture of
70 parts of a trifunctional poly(propylene oxide) with poly(ethylene oxide) end groups, having an OH number of 25 (Lupranol 1371 from BASF AG),
30 parts of a reaction product of oleic acid and diethanolamine (Luprintan HDF from BASF AG),
3 parts of a silicone-containing stabilizer (Tegostab B 1903 from Goldschmidt AG),
4 parts of dimethylethanolamine and
50 parts of water is reacted at room temperature with
230 parts of a mixture of diphenylmethane diisocyanates and polyphenyl-polymethylene polyisocyanates (crude MDI).

The rising mixture is poured onto a flat sheet and allowed to expand.

EXAMPLE 10

Component A:
70 parts of a trifunctional poly(propylene oxide) with poly(ethylene oxide) end groups, having an OH number of 35 (Lupranol 1341 from BASF AG),
30 parts of a reaction product of oleic acid and diethanolamine (Luprintan HDF from BASF AG),
3 parts of a silicone-containing stabilizer (Tegostab B 1903 from Goldschmidt),
2 parts of N,N',N',N'',N''-pentamethyl-diethylene-triamine,
4 parts of dimethylethanolamine,
3 parts of triethylenediamine (Dabco 33 LV from Houdry Process Corp.), and
75 parts of water are mixed together.
Component B:
230 parts crude MDI (Lupranat M 20 from BASF AG).

Components A and B are thoroughly mixed together at room temperature, and the resulting mixture is poured onto a flat sheet and allowed to expand.

EXAMPLE 11

Component A:
100 parts of a trifunctional polyetherol with poly(ethylene oxide) end groups, having an OH number of 35 (Scuranol P 780 from Rhône-Poulenc),
100 parts of water,
20 parts of acetone,
3 parts of a silicone-containing stabilizer (DC 190 from Dow Corning),
4 parts of dimethylethanolamine,
3 parts of an amine catalyst (Dabco 33 LV), and
2 parts of an amine catalyst (Niax A1) are mixed together.
Component B:

180.5 parts of a mixture of crude MDI (Lupranat M 20) and toluylene diisocyanates in a weight ratio of 1:1.

Components A and B are thoroughly mixed together at room temperature, and the resulting mixture is poured onto a flat sheet and allowed to expand.

COMPARATIVE EXAMPLE D

Component 1:
100 kg of a trifunctional polyetherol with an OH number of 42 (Lupranol 1120 from BASF AG),
3.5 kg of water,
0.3 kg of an amine catalyst (Dabco 33 LV), and
0.3 kg of dimethylethanolamine are thoroughly mixed together.
Component 2:
0.7 kg of a foam stabilizer (Tegostol BF 2370 from Goldschmidt AG)
Component 3:
0.22 kg of tin dioctoate.
Component 4:
40.5 kg of a mixture of 2,4-toluylene diisocyanate and 2,6-toluylenediisocyanate weight ratio 80:20).

Components 1 to 4 are mixed in a foaming apparatus (manufactured by Zippel, Model No. DS 1). The rising mixture is then allowed to expand in a wooden mold having an internal base area of 60×90 cm and then heated at 120°-130° C. for 5 minutes to dry the surface.

COMPARATIVE EXAMPLE E

A block of foam, manufactured according to Comparative Example D, measuring 76.2×76.2×38.1 mm (3×3×1.5 in) is impregnated by immersion in a 4 percent hexane solution of natural rubber and dried as disclosed in Example 1 of U.S. Pat. No. 3,888,766 (W. J. De Young). In contrast to the disclosure of the said U.S. patent, compression of the foam block to a thickness of 7% of its starting thickness under a pressure of 300 psi causes it to remain in its compressed state only for a short time. After about 30 minutes the foam has returned to its original height.

COMPARATIVE EXAMPLE F 100 parts of an ether polyol (a propylene oxide adduct of glycerol having an OH number of 150),
0.2 part of tin dioctoate,
2 parts of N-ethylmorpholine,
2 parts of water,
0.5 part of L-520 surfactant,
0.5 part of carbon black,
2.5 parts of tall oil, and
5 parts of polyisobutylene (Oppanol B1 from BASF AG, molecular weight 300)
are thoroughly mixed and reacted with
40.7 parts of toluylene diisocyanate (index 95)
while stirring with a hand mixer (1650 rpm), as disclosed in U.S. Pat. No. 3,567,663, (R. P. Triolo et al).

The rising foam is poured into a cardboard box having an internal base area of 15×15 cm and after expansion is over (2 min.), the foam is heated for 10 minutes at 120° C. The resulting foam body has to be subjected to compression.

COMPARATIVE EXAMPLE G 70 g of N,N,N',N'-tetrakis-(2-hydroxypropyl)-ethylene diamine (Lupranol 3400 from BASF AG),
20 g of castor oil (Polycin 61 not available),
4 L of Span 20,
4 g of Tween 21, and
5 g of polydimethyl siloxane (DC 190 from Dow Corning) are thoroughly mixed, as disclosed in Example 2 of U.S. Pat. No. 3,886,067 (S. W. Miranda), to form the polymerizing agent.
10 parts of the polymerizing agent,
15 parts of trichlorofluoromethane, and
100 parts of toluylene diisocyanate (mixture of 2,4- and 2,6-isomers in a weight ratio of 80:20)
are then thoroughly mixed. Although the reaction mixture becomes warm, it does not expand so that a foam cannot be obtained.

COMPARATIVE EXAMPLE H

As described in Example 4 of U.S. Pat. No. 3,886,067 (S. W. Miranda), 40 parts of a polymerizing agent prepared from 50 parts of N,N,N'.N'-tetrakis-(2-hydroxypropyl)-ethylene diamine,
40 parts of castor oil (Polycin 61 not available),
4 parts of Tween 21,
4 parts of Span 20, and
2 parts of silicone oil (DC 190 from Dow Corning)
are mixed with 3 parts of a foaming agent mixture and 63 parts of a mixture of 2,4- and 2,6-toluylene diisocyanates in a weight ratio of 80:20, and the resulting mixture is allowed to expand.

The foaming agent mixture was prepared from
90 parts of water, and
80 parts of polydimethyl siloxane (DC 190 from Dow Corning) because No. 365 of Alpco Chemical Co. and No. 1058 of Witco Chemical Co. were not available.

A rigid foam whose core is slightly discolored is obtained.

COMPARATIVE EXAMPLE I

The procedure of Comparative Example H is followed, a mixture of 50 parts of polymerizing agent,
1 part of foaming agent mixture, and
100 parts of crude MDI (Lupranat M 20) being allowed to expand.

A high-density rigid foam whose core exhibits tears is obtained.

To determine the properties of the foams, they were cut up into blocks measuring 76.2×76.2×38.1 mm (3×3×1.5 in) and their densities were ascertained.

As disclosed in U.S. Pat. No. 3,888,766, the blocks were crushed under a pressure of 300 psi, and their compressibility was then determined.

The porosity of the foams was determined using a compressed air measuring apparatus (manufactured by Feinmess- und Prüfgeräte GmbH, Goettingen, Germany; Model No. 2001).

TABLE 3

| Ex. | Ratio of NCO groups to H atoms capable of undergoing a Zerewitinoff reaction | Density (g/l) | Compressible - | Remarks | Proportion of open cells |
|---|---|---|---|---|---|
| 6 | 0.3:1 | 4.9 | yes | after compression, foam returns slowly to 85-95% of its original height | 92% |
| 7 | 0.3:1 | 6.5 | " | | 95% |
| 8 | 0.3:1 | 5.7 | " | | 97% |
| 9 | 0.29:1 | 9.0 | " | | 88% |
| 10 | 0.2:1 | 9.6 | " | | 97% |
| 11 | 0.15:1 | 12.6 | " | | 90% |

TABLE 3-continued

| | Ratio of NCO groups to H atoms capable of undergoing a Zerewitinoff reaction | Density (g/l) | Compressible - Remarks | Proportion of open cells |
|---|---|---|---|---|
| Comp. Ex. | | | | |
| D | 1.05:1 | 28.5 | yes, very resilient | 100% |
| E | 1.05:1 | 18.6 | yes; after compression, foam remains in compressed state and then recovers slowly. | 100% |
| F | 0.95:1 | 50.0 | yes, resilient | 100% |
| G | 11.5:1 | — | — | — |
| H | 1.55:1 | 39.6 | no | 68% |
| I | 1.73:1 | 450 | no | 9% |

Oil-absorbing and oil-retaining properties

Diesel oil (according to German Standard Specification (DIN) 2410) is poured into a plastics vessel, the base of which measures 12×12 cm, to a height of 4.5 cm above the bottom of the vessel.

The foam blocks described above (cf. Table 3) are placed on top of the oil and left for 30 minutes. They are then removed and hung up at one corner and allowed to drip for one minute. The weight of each oil-containing block is determined and the oil absorption is given as n times the initial weight of the foam block.

TABLE 4

$$\text{Oil absorption} = \frac{\text{weight of oil-containing foam} - \text{weight of original foam}}{\text{weight of original foam}}$$

| | Oil absorption | Remarks |
|---|---|---|
| Example | | |
| 6 | 139.5 | floats |
| 7 | 99.5 | " |
| 8 | 128 | " |
| 9 | 89 | " |
| 10 | 67 | " |
| 11 | 65 | " |
| Comp. Example | | |
| D | 0.92 | floats |
| E (uncompressed block) | 10.3 | fills rapidly with oil, sinks, allows large proportion of oil to flow out when hung up to drip |
| E (block compressed to 7% of its original height) | 9.9 | |
| F | 0.63 | floats |
| G | — | — |
| H | 0.86 | floats |
| I | 0.03 | " |

A comparison of Examples 6 to 11 and Comparative Examples D to I shows that the extremely low-density foams of the invention having densities of from 4 to 15 g/liters, 70 to 98% of open cells and a large internal surface area due to the fact that most of the filmy cell faces are still present, which has a favorable influence on the oil-absorbing and oil-retaining capacity of the foam, have a more than 6 times higher oil-absorbing capacity than the prior art foams.

We claim:

1. Hydrophobic polyurethane foams, which have densities of from 4 to 15 g/liters and in which the number of closed cells is from 2 to 30%, and the number of open cells from 98 to 70%, based on the total number of cells, and which are prepared by reacting organic polyisocyanates, polyhydroxy compounds, catalysts and water, with or without blowing agents, lipophilic compounds, chain extenders, assistants and additives, the starting components being reacted in such amounts that
   (a) the ratio of all hydrogen atoms capable of undergoing a Zerewitinoff reaction—there hydrogen atoms being bonded to the polyhydroxy compound and water and to the lipophilic compound and chain extender if used—to the NCO groups of the polyisocyanate is from 1.3 to 10:1, and
   (b) the ratio of hydrogen atoms capable of undergoing a Zerewitinoff reaction—these hydrogen atoms being bonded to the polyhydroxy compound and to the lipophilic compound and chain extender if used—to the NCO groups of the polyisocyanate is from 0.7 to 1.3:1.

2. Hydrophobic polyurethane foams as set forth in claim 1, in the manufacture of which lipophilic compounds selected from the group consisting of unsubstituted, substituted, saturated and unsaturated aliphatic fatty acids of 10 to 25 carbon atoms and their esters and amides are co-used.

3. Hydrophobic polyurethane foams as set forth in claim 2, wherein the molar ratio of polyhydroxy compound to lipophilic compounds is from 1:3 to 1:20.

4. A process for separating hydrophobic compounds from water, said hydrophobic compounds being selected from the group consisting of oil, crude oil, fuel oil, diesel oil, hexane, benzene, toluene, aniline, chloroform, carbon tetrachloride, dichloroethane and hexachlorocyclopentadiene which comprises: contacting said hydrophobic compound with a hydrophobic polyurethane foam of claim 1.

* * * * *

UNITED STATES PATENT AND TRADEMARK OFFICE
CERTIFICATE OF CORRECTION

PATENT NO. : 4,237,237
DATED : December 2, 1980
INVENTOR(S) : Wolfgang Jarre and Rolf Wurmb It is certified that error appears in the above—identified patent and that said Letters Patent is hereby corrected as shown below:

On claim 1, line 22, "g/litus" should read --g/liter--, and
on claim 1(a), line 31, "there" should read --these--.

Signed and Sealed this

Nineteenth Day of May 1981

[SEAL]

Attest:

RENE D. TEGTMEYER

Attesting Officer    Acting Commissioner of Patents and Trademarks